July 8, 1924.

R. T. WHIPPLE

AUTOMATIC BRAKE ROD TAKE-UP

Filed Dec. 4, 1922

1,500,695

2 Sheets-Sheet 1

Inventor:
RAYMOND T. WHIPPLE.

Victor J. Evans
Attorneys.

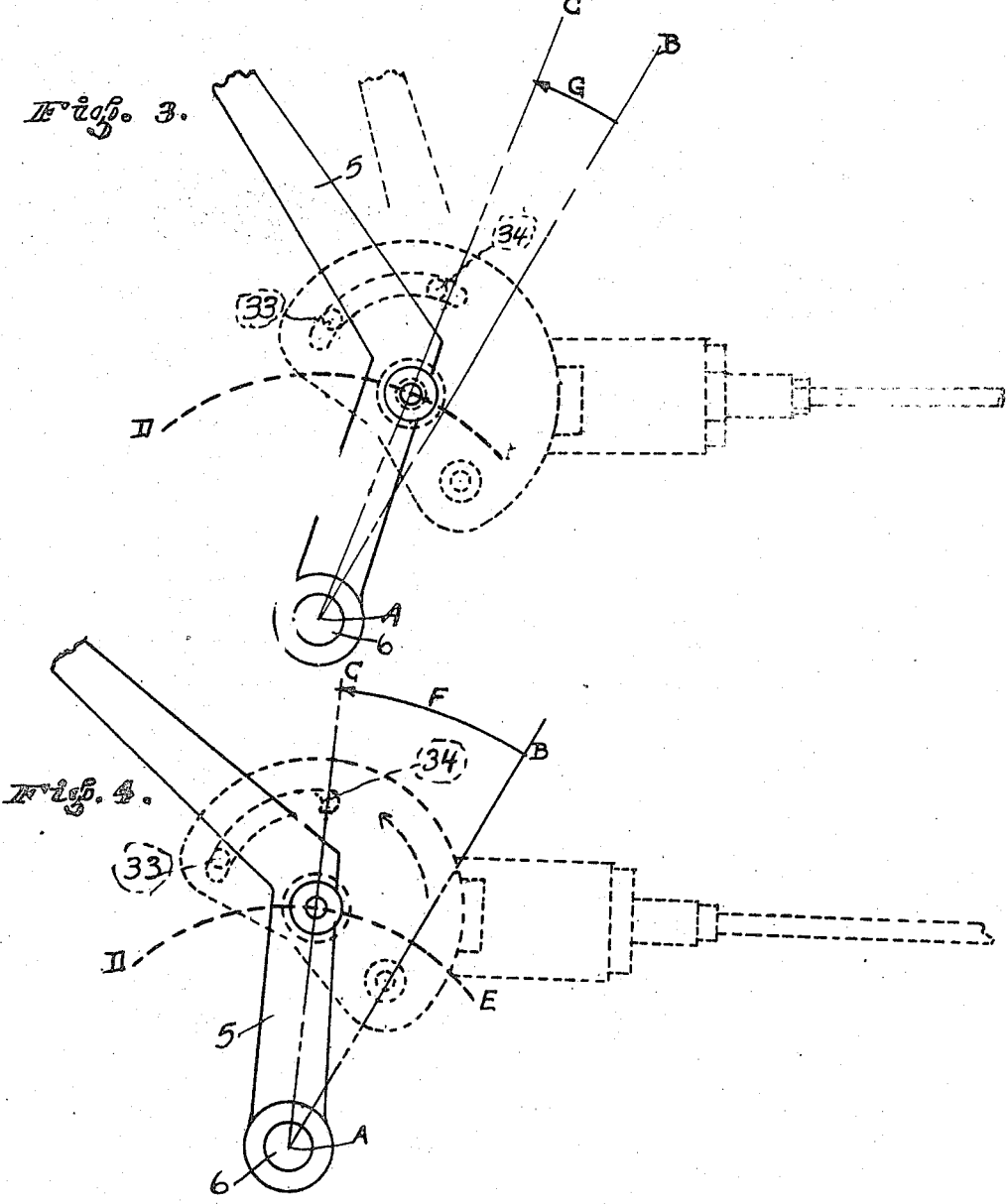
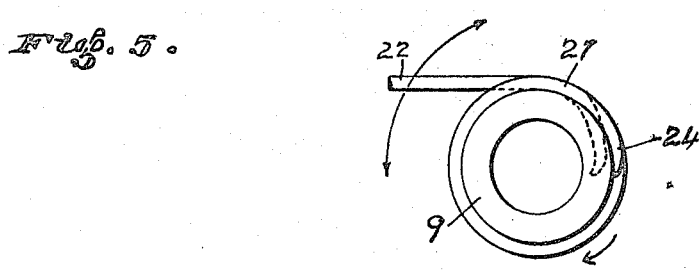

Patented July 8, 1924.

1,500,695

UNITED STATES PATENT OFFICE.

RAYMOND T. WHIPPLE, OF SAN FRANCISCO, CALIFORNIA.

AUTOMATIC BRAKE-ROD TAKE-UP.

Application filed December 4, 1922. Serial No. 604,884.

*To all whom it may concern:*

Be it known that I, RAYMOND T. WHIPPLE, a citizen of the United States, residing at San Francisco, in the county of San Francisco and State of California, have invented new and useful Improvements in Automatic Brake-Rod Take-Ups, of which the following is a specification.

This invention relates to improvements in automatic brake rod take ups.

The principal object of this invention is to provide an automatic take up for brake rods whereby it will not be necessary to manually shorten the brake rod as the brake bands wear, as is now the practice.

Another object is to provide a take up which may be applied to any type of car having an oscillating brake pedal with a rod extending rearwardly therefrom to the brake bands, in counter-distinction to the method of applying brakes in a Ford car.

A further object is to provide a device which will not take up on the brake rod except when the brake pedal has been moved an excessive distance.

A still further object is to provide a device of this character which is simple in construction, cheap to manufacture and one which may be sold at a reasonable price.

An additional object of this invention is to construct a device of this nature which may be applied to the standard makes of cars without necessitating any changes in their mechanical construction.

Other objects and advantages will be apparent during the course of the following description.

Figure 1:
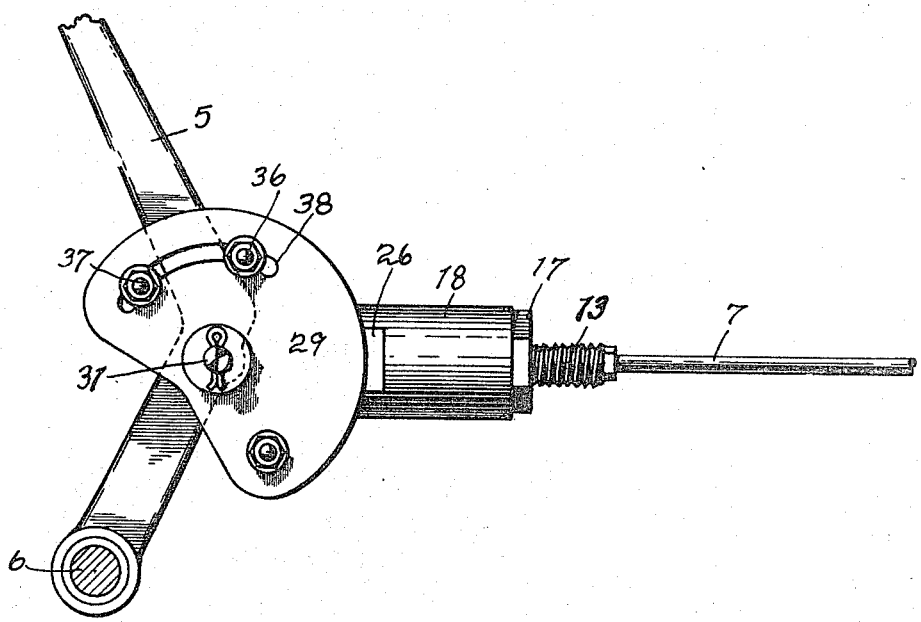
Figure 2:
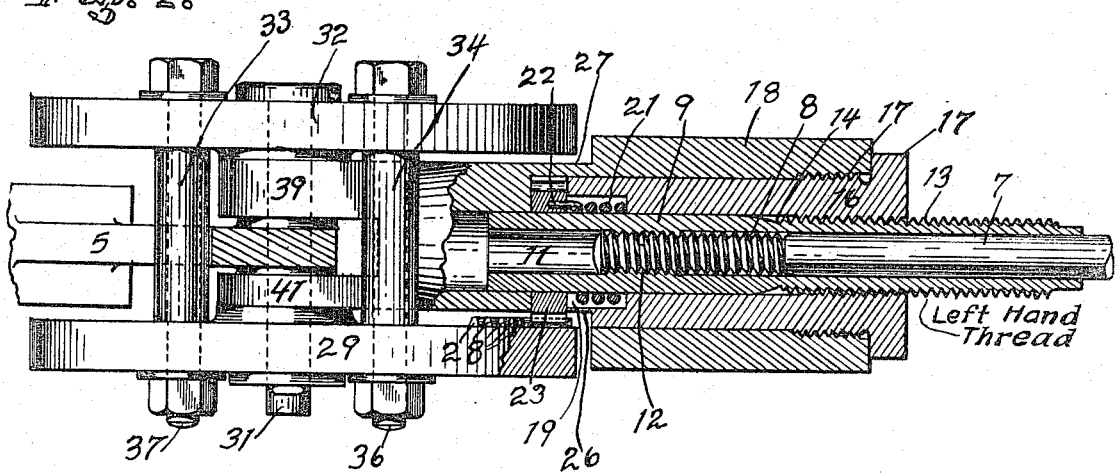

In the accompanying drawings forming a part of this specification, and in which like numerals are employed to designate like parts throughout the same, Figure 1 is a side elevation of my device as applied to a brake pedal and brake rod, Figure 2 is an enlarged top plan view of my device shown partly in elevation, and partly in cross-section, Figure 3 is a diagrammatic view showing the pedal movement of my device from normal position to braking position, Figure 4 is a diagrammatic view showing the pedal movement of my device from the normal position to excessive brake position, and Figure 5 is an end elevation of a coiled clutch spring and take up sleeve.

In motor vehicles, other than the Ford type, it is customary to have an oscillating brake pedal to which a brake rod is pivoted, which brake rod extends rearwardly and is connected to the brake bands for the purpose of compressing the same to the brake drum. The pedal has a limited amount of movement between normal position and braking position. This amount of movement is necessary to prevent dragging of the brake band upon the brake drum. As the brake band wears, greater compression can take place, consequently, greater movement of the brake pedal results. As this brake movement increases, it is necessary to take up the brake rod to compensate for this additional movement. This taking up of the brake rod is somewhat difficult as the brake rod is usually mounted beneath the machine and rather inaccessible.

I therefore propose to overcome the usual difficulties by tightening the brake rod and at the same time maintaining the brakes in a normal condition by mounting between the brake pedal and brake rod an automatic compensating device which will, through the natural movement of the brake pedal, take up the brake rod when the movement of the brake pedal is in excess of the normal movement.

In the accompanying drawings wherein for the purpose of illustration is shown a preferred embodiment of my invention, the numeral 5 designates a brake pedal, fulcrumed as at 6 and adapted to oscillate about this point, and at 7 I have shown the customary brake rod. This rod is screw threaded as shown at 8, which screw under normal conditions is adapted to enter a clevis, which is pivoted to the brake pedal. In place of this clevis, I provide a take up sleeve 9, which is provided with an internal bore 11 having a screw thread 12 therein which is adapted to engage the screw thread upon the rod 7, the screw thread upon the rod 7 being a right hand thread. This take up sleeve 9 is provided upon its outer surface with a left hand screw thread 13 and with a tapered recess 14, the purpose of which will be later seen. This take up sleeve 9 is in turn threaded in a bushing 16, which bushing is provided with a hexagonal head 17 in order that a wrench may be applied thereto. This bushing is threaded as shown at 17' so as to engage a housing 18.

The bushing 16 is internally bored as shown at 19 for the reception of a coiled spring 21, which coiled spring has a bent end 22 in engagement with a gear 23, which gear is freely mounted upon the take up sleeve 9. The opposite end 24 of this spring is bent as shown in dotted lines in Figure 5, so that it will be in intimate frictional engagement with the take up sleeve 9. The housing 18 is provided with flattened side faces as shown at 26 and 27. It will be noted that the flattened face 26 is formed deeper than the flattened face 27 for the purpose of allowing the gear 23 to project through this face so as to engage teeth 28 formed in a plate 29. This plate is pivoted upon a pin 31 passing through the brake pedal 5. A similar plate 32 is mounted upon the opposite side of the brake pedal. These plates are spaced one from the other as by spacers 33 and 34 having bolts 36 and 37 passing therethrough. These bolts carry nuts upon one end thereof so that they may be adjusted in slots 38 formed in each of these plates.

This construction can best be seen in Figures 1 and 2, where it will also be noted that the housing 18 is provided with bifurcated ends as shown at 39 and 41 which straddle the brake rod 5 and are also pivoted upon the pin 31.

The operation of my device is as follows:—

By viewing Figures 3 and 4, it will be noted that after the pedal is pushed from the position represented by the line A B to the position represented by the line A C it will not contact the spacers 33 and 34, the result being that there is no movement transmitted to the plates 29 and 32 other than a reciprocating motion in the arc D E. When the brake bands have become worn, the result will be that the pedal movement will become greater as represented by the arc F of Figure 4 as in comparison with the arc G of Figure 3. With this greater movement, it will be noted that the brake pedal 5 contacts the spacer 33 upon its forward movement thereby causing a slight rotation of the plates 29 and 32 in the direction of the dotted arrow of this figure. Upon the return movement of the pedal, the spacer 34 will be contacted causing a slight movement of the plates in a reverse direction. The result of this plate movement is as follows: When the plate moves in the direction shown in the dotted arrow in Figure 4, motion is transmitted by the teeth 28 and plate 29 to the gear 23, and as this gear is free to rotate upon the take up sleeve 9, no movement will be transmitted thereto. At the same time, the coiled spring 21 will be caused to move in the direction shown by the arrow in Figure 5, or in other words, the coiled spring will slip on the take up sleeve 9, as it is being moved in a direction tending to unwind the spring, when the brake pedal is released so that the plates move in an opposite direction through the contact of the pedal with the spacer 33, the result is that the gear 23 is caused to move in an opposite direction, or in other words, to return to its normal position. In returning to its normal position, it tends to wind the spring 21 tightly upon the take up sleeve 9, thereby clutching the same and causing the sleeve to rotate in unison with the gear 23. This rotation of the sleeve, due to its external left hand thread and its internal right hand thread, causes the brake rod 7 to be drawn further into the sleeve.

It will thus be seen that as long as the pedal movement is normal, no rotary movement of the plates takes place, and consequently, no shortening of the brake rod occurs.

To automatically limit the amount of take up which can occur, I provide a tapered portion 14, the result being that when the end 24 of the spring 21 reaches this point it can no longer grip the sleeve, and consequently my device ceases to function further.

It will thus be seen that I have provided a very simple mechanism for automatically compensating for the wear incident to brake applications.

It is to be understood that the form of my invention herewith shown and described is to be taken as a preferred example of the same, and that various changes in the shape, size and arrangements of parts may be resorted to without departing from the spirit of the invention or the scope of the subjoined claims.

Having thus described my invention, I claim:—

1. In a device of the character described, the combination with a brake pedal adapted to oscillate about a given point, of means pivoted to said pedal at a point remote from the pivotal point of said pedal and adapted to be oscillated about its pivotal point, a brake rod extending in a substantially horizontal plane from said pedal, means interposed between said brake rod and said pedal for taking up said brake rod when said first mentioned means is oscillated.

2. In a device of the character described, the combination with a brake pedal adapted to oscillate about its pivotal point, plates pivoted on opposite sides of said pedal at a point remote from the pivotal point of said pedal, means for limiting the pivotal action of said plates with respect to said pedal, a brake rod extending in a substantially horizontal plane from said pedal, take up means positioned between said brake rod and said pedal, said take up means being pivoted to said pedal and being screw threaded upon said brake rod, and means mounted on one of said plates for actuating said take up means when said plates are rotated about their pivotal points.

3. In a device of the character described, the combination of a pedal adapted to be oscillated, a brake rod extending in a substantially horizontal plane from said pedal, a take up sleeve threadedly engaged on said brake rod, a gear loosely mounted on said take up sleeve, a spring clutch on said sleeve and having a bent end engaging said gear, a plate pivotally mounted on said brake pedal at a point remote from the pivotal point of said brake pedal, teeth formed on the face of said plate and adapted to engage said gear, movable stops secured to said plates for the purpose of limiting the amount of movement of said plates with respect to said pedal, substantially as and for the purpose specified.

In testimony whereof I affix my signature.

RAYMOND T. WHIPPLE.